US012555400B2

(12) United States Patent
Zhuang et al.

(10) Patent No.: US 12,555,400 B2
(45) Date of Patent: Feb. 17, 2026

(54) ONLINE HANDWRITING DOCUMENT LAYOUT ANALYSIS SYSTEM

(71) Applicant: SUNIA PTE. LTD., Singapore (SG)

(72) Inventors: Jianming Zhuang, Singapore (SG); Chung Kwong Chan, Shenzhen (CN)

(73) Assignee: SUNIA PTE. LTD., Singapore (SG)

( * ) Notice: Subject to any disclaimer, the term of this patent is extended or adjusted under 35 U.S.C. 154(b) by 281 days.

(21) Appl. No.: 18/445,731

(22) Filed: Jan. 5, 2024

(65) Prior Publication Data

US 2025/0225808 A1 Jul. 10, 2025

(51) Int. Cl.
*G06V 30/413* (2022.01)
*G06V 30/148* (2022.01)
(Continued)

(52) U.S. Cl.
CPC .......... *G06V 30/413* (2022.01); *G06V 30/148* (2022.01); *G06V 30/16* (2022.01);
(Continued)

(58) Field of Classification Search
CPC .... G06V 30/413; G06V 30/148; G06V 30/16; G06V 30/1801; G06V 30/18181; G06V 30/19173; G06V 30/22; G06V 30/412; G06V 30/347; G06V 30/36; G06V 10/82; G06V 30/2268; G06V 10/44; G06V 30/10; G06V 30/226; G06V 30/414; G06V 10/22; G06V 10/72; G06V 10/764; G06V 30/416; G06V 40/30; G06F 3/04883; G06F 40/30; G06F 16/9024; G06F 16/93; G06F 18/24; G06F 40/205; G06F 40/211; G06N 3/045; G06N 3/0464; G06N 3/09; G06N 20/00;
(Continued)

(56) References Cited

U.S. PATENT DOCUMENTS 7,369,702 B2 * 5/2008 Abdulkader ....... G06V 30/2455
382/187
8,913,032 B2 * 12/2014 Kikuchi .............. G06F 3/04186
345/174
(Continued)

OTHER PUBLICATIONS

"Instance GNN: A Learning Framework for Joint Symbol Segmentation and Recognition in Online Handwritten Diagrams"; Xiao-Long Yun, IEEE Transactions on Multimedia (vol. 24, 2022, pp. 2580-2594) (Year: 2021).*

*Primary Examiner* — Michael S Osinski (57) ABSTRACT

An online handwriting document layout analysis system includes a preprocess unit serving to receive a document composed of a plurality of strokes and to generate an undirected graph including a plurality of nodes and a plurality of edges for representing relations between different strokes. A bidirectional recursive neural network unit for initializing a feature vector of each of the nodes and initializing a feature vector of each of edges. A graphic neural network unit serves to update the feature vectors of the nodes and the edges for obtaining updated feature vectors. A fully connected neural network unit serves for performing a coarse-grained object classifying and a fine-grained object classifying for each of the nodes and the edges based on the updated feature vectors. A document restoration unit serves for restoring a tree structure of the document.

10 Claims, 7 Drawing Sheets

(51) Int. Cl.
*G06V 30/16* (2022.01)
*G06V 30/18* (2022.01)
*G06V 30/19* (2022.01)
*G06V 30/22* (2022.01)
*G06V 30/412* (2022.01)

(52) U.S. Cl.
CPC .... *G06V 30/1801* (2022.01); *G06V 30/18181* (2022.01); *G06V 30/19173* (2022.01); *G06V 30/22* (2022.01); *G06V 30/412* (2022.01)

(58) Field of Classification Search
CPC ........ G06N 3/02; G06N 3/044; G06N 3/0442; G06N 3/08; G06N 7/01; G06T 7/60; G06T 7/64
See application file for complete search history.

(56) References Cited

U.S. PATENT DOCUMENTS

| | | | | |
|---|---|---|---|---|
| 8,952,908 | B2* | 2/2015 | Ohta | G06F 3/04883 345/173 |
| 9,141,853 | B1* | 9/2015 | Rubio | G06V 30/416 |
| 9,665,768 | B2* | 5/2017 | Marcelli | G06V 30/1914 |
| 10,963,784 | B1* | 3/2021 | Gauthier | G06F 40/211 |
| 11,216,620 | B1* | 1/2022 | Jin | G06F 40/30 |
| 11,715,313 | B2* | 8/2023 | Chua | G06F 18/2413 382/177 |
| 11,755,195 | B2* | 9/2023 | Weber | G06F 3/04883 715/268 |
| 11,847,175 | B2* | 12/2023 | Ferreira | G06V 30/412 |
| 11,854,284 | B2* | 12/2023 | Chen | G06V 30/36 |
| 11,989,979 | B2* | 5/2024 | Houmani | G06V 30/226 |
| 12,211,304 | B2* | 1/2025 | Li | G06F 18/253 |
| 12,287,850 | B2* | 4/2025 | Zhuang | G06V 10/20 |
| 2002/0164063 | A1* | 11/2002 | Heckman | G06T 7/62 382/133 |
| 2005/0187954 | A1* | 8/2005 | Raman | G06F 16/80 |
| 2008/0123940 | A1* | 5/2008 | Kundu | G06V 30/2268 382/186 |
| 2013/0100018 | A1* | 4/2013 | Honji | G06F 3/0416 345/157 |
| 2015/0095770 | A1* | 4/2015 | Mani | G06F 16/93 715/254 |
| 2015/0356360 | A1* | 12/2015 | Wimmer | G06V 30/2268 382/189 |
| 2016/0179365 | A1* | 6/2016 | Angelov | G06F 3/03545 345/179 |
| 2017/0004122 | A1* | 1/2017 | Taniguchi | G06F 3/04883 |
| 2017/0235820 | A1* | 8/2017 | Conrad | G06F 40/295 707/728 |
| 2018/0025303 | A1* | 1/2018 | Janz | G16H 50/20 705/2 |
| 2020/0293810 | A1* | 9/2020 | Kanada | G06V 30/412 |
| 2020/0364451 | A1* | 11/2020 | Ammar | G06V 10/768 |
| 2020/0401796 | A1* | 12/2020 | Chateigner | G06F 40/151 |
| 2021/0209472 | A1* | 7/2021 | Chen | G06N 3/08 |
| 2021/0224528 | A1* | 7/2021 | Mannby | G06F 3/04883 |
| 2021/0279457 | A1* | 9/2021 | Suyash | G06F 17/18 |
| 2021/0286856 | A1* | 9/2021 | Shen | G06F 16/9577 |
| 2021/0295101 | A1* | 9/2021 | Tang | G06V 30/19173 |
| 2021/0350122 | A1* | 11/2021 | Dixon | G06V 30/36 |
| 2021/0383067 | A1* | 12/2021 | Reisswig | G06F 16/367 |
| 2022/0156486 | A1* | 5/2022 | Chen | G06F 18/21 |
| 2022/0188541 | A1* | 6/2022 | Elachqar | G06V 30/347 |
| 2023/0084641 | A1* | 3/2023 | Roy | G06V 30/244 382/182 |
| 2023/0245483 | A1* | 8/2023 | Zhang | G06V 10/82 382/157 |
| 2023/0351112 | A1* | 11/2023 | Ozaki | G06F 40/205 |
| 2024/0029461 | A1* | 1/2024 | Park | G06V 30/347 |
| 2024/0087349 | A1* | 3/2024 | Zhuang | G06V 30/36 |
| 2024/0201957 | A1* | 6/2024 | Chaurasia | G06F 8/36 |
| 2024/0312233 | A1* | 9/2024 | Kumar | G06V 30/18 |
| 2025/0054273 | A1* | 2/2025 | Williams | G06V 10/44 |

* cited by examiner

ONLINE HANDWRITING DOCUMENT LAYOUT ANALYSIS SYSTEM

FIELD OF THE INVENTION

The present invention is related to a layout analysis system, and in particular to an online handwriting document layout analysis system.

BACKGROUND OF THE INVENTION

Online handwriting document layout analysis is used to segment strokes into different sets and determine the content type of each set of stroke, such as tables, annotations, etc. There are already relatively mature techniques for recognizing lines of text, mathematical formulas, and shapes, respectively. Breaking down the handwriting content into recognizable objects helps the system make sense of the handwriting content composed of multiple content types, which combines the free-writing experience of traditional paper with the searchability of electronic information.

In prior arts, traditional layout analysis algorithms for online handwriting documents are generally based on artificial neural networks, especially on recurrent neural networks or graphical neural networks. However, the drawback of the recurrent neural networks approach is that it is difficult to effectively utilize the two-dimensional spatial information in the document, while the drawback of the graphical neural network approach is that it is unable to fully utilize the feature engineering of the information.

Moreover, for various layout analysis works such as text or non-text classification, text line segmentation, chart detection and identification, table detection and identification, and mathematical formula detection, etc., the traditional methods can only be used to analyze a few of above analysis works, and cannot be integrated to analyze all of the above works at the same time. However, the actual content of the document is quite complex because it may contain tables, charts, text and a variety of different types of contents. Each of the traditional methods can only identify a few types of the contents of the document, which cannot meet the requirement of the actual use.

As a result, the present invention desires to provide a novel invention with recurrent neural networks or graphical neural networks to solve the disadvantages of above prior arts.

SUMMARY OF THE INVENTION

Accordingly, for improving above mentioned defects in the prior art, the object of the present invention is to provide an online handwriting document layout analysis system, wherein the advantages of the present invention are that, in the present invention, the online handwriting document layout analysis system is capable of supporting segmentation and classification over a range of multiple granularity objects, which can simultaneously perform text/non-text classification, text line segmentation, chart detection and identification, table detection and identification, and mathematical formula detection. The present invention is capable of performing various fine-grained object segmentation and classification simultaneously, dividing strokes into multiple coarse-grained objects and determining whether they are a paragraph, a list, a table, a chart, or an annotation. The present invention also can subdivide the strokes of each coarse-grained object into multiple fine-grained objects and determining whether they are a line of text, a formula, a basic shape, a graffiti, or a set of mistyped strokes. Therefore, the text/non-text classification, text line segmentation, chart detection and identification, table detection and identification, and mathematical formula detection can all be analyzed by using the system of the present invention.

To achieve above object, the present invention provides an online handwriting document layout analysis system; the system serving for segmenting a document into a plurality of coarse-grained objects for determining whether a type of each of the coarse-grained objects is a paragraph, a list, a table, a chart or an annotation; each of the coarse-grained objects being spilt into a plurality of fine-grained objects; the system serving for determining whether a type of each of the fine-grained objects is a text line, a formula, a basic shape, a graffiti, or a set of mistyped strokes; the coarse-grained objects and the fine-grained objects forming a tree structure; the system comprising a mainframe which includes a processor and a memory; and the processor serving for executing required operations of the system and the memory serving for storing data, programs and related operation results of the system; the system further comprising: a preprocess unit serving to receive the document for performing a preprocessing on the document; the document being an online handwriting document and being composed of a plurality of strokes which are close in time or space; wherein in the preprocessing of the preprocess unit, the preprocess unit serves to generate an undirected graph for representing relations between different strokes of the document; the undirected graph includes a plurality of nodes and a plurality of edges; each of the nodes is corresponded to a respective one stroke, which is a directed sequence composed of the points of the stroke according to a writing order; each of the edges is corresponded to a pair of respective strokes which are close in time or space; the pair of respective strokes close in time or space is corresponded to a respective one edge; each of the strokes and itself further form a set to form a respective one edge which is called a loop; that is, the loop is an edge connecting one stroke to itself; wherein in the undirected graph, each of the strokes is considered to be close in time to at most $N_T$ strokes written after it; for each of the strokes, a closest point distance between the stroke and the other strokes is calculated for determining at most $N_S$ strokes spatially closest in space to the stroke; each of $N_T$ and $N_S$ is a predetermined value; a bidirectional recursive neural network unit connected to the preprocess unit for initializing a feature vector of each of the nodes in the undirected graph and initializing a feature vector of each of edges in the undirected graph by using recursive neural networks (RNN); wherein in the bidirectional recursive neural network unit, the feature vector of each of the edges is initialized with zero values; a graphic neural network unit connected to the bidirectional recursive neural network unit; the graphic neural network unit serving to update the feature vector of each of the nodes and the feature vector of each of the edges for obtaining an updated feature vector of each of the nodes and an updated feature vector of each of the edges by using a graphic neural network (GNN) which is based on a message passing; a fully connected neural network unit connected to the graphic neural network unit; the fully connected neural network unit serving for predicting the type of the coarse-grained object and the fine-grained object for the strokes corresponded to each of the nodes and for predicting that whether the pair of strokes corresponding to each of the edges belong to a same coarse-grained object or a same fine-grained object; wherein in the predicting of the fully connected neural network unit, a coarse-grained object classifying and a fine-grained object classifying are performed for each of the nodes and the edges by using fully connected neural networks (FNN) based on the updated feature vectors of the nodes and the edges from the graphic neural network unit; a document restoration unit connected to the fully connected neural network unit for restoring the tree structure of the document; the document restoration unit serving to group all strokes to obtain the corresponding fine-grained objects by using a connected component analysis according to predicting results of the strokes belonging to the same fine-grained object in the fully connected neural network unit; wherein in the document restoration unit, the type of each of the corresponding fine-grained objects is determined by a sum of the confidences that the strokes in the fine-grained object are predicted to belong to a specific type of the fine-grained object in the fully connected neural network unit; and the document restoration unit further serving to group the corresponding fine-grained objects to obtain the corresponding coarse-grained objects by using a connected component analysis according to predicting results of the strokes belonging to the same coarse-grained object in the fully connected neural network unit; wherein in the document restoration unit, the type of each of the corresponding coarse-grained objects is determined by a sum of the confidences that the strokes in the coarse-grained object are predicted to belong to a specific type of the coarse-grained object in the fully connected neural network unit.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 5:
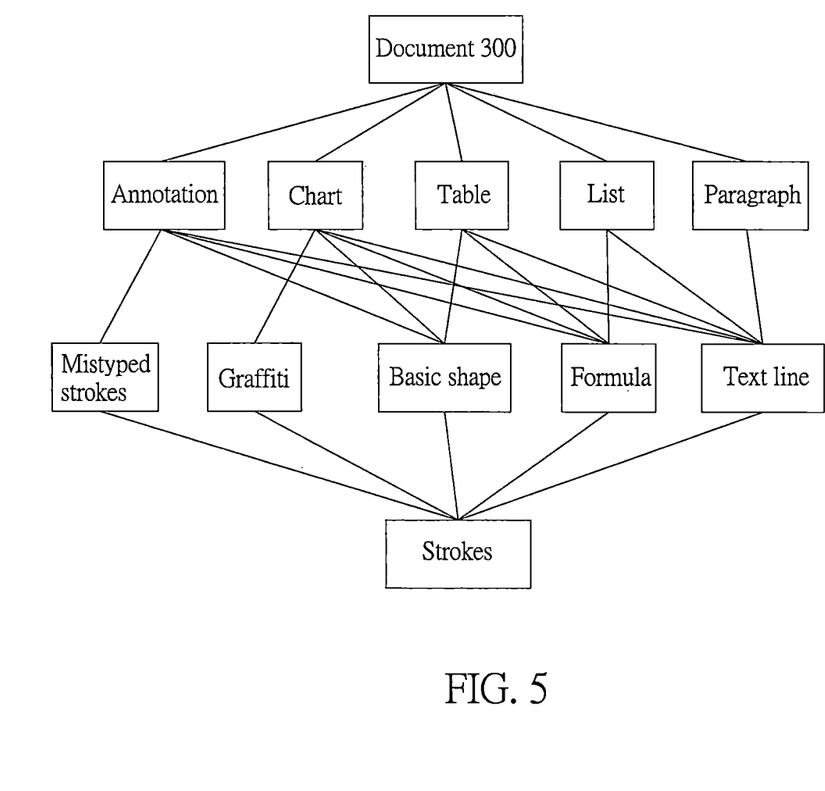
FIG. 5 is a schematic view showing the tree structure of the document of the present invention.

The present invention provides an online handwriting document layout analysis system 1 for performing segmentation and classification over a range of multiple granularity objects. Referring to FIG. 5, the system 1 serves for segmenting a document 300 into a plurality of coarse-grained objects for determining whether a type of each of the coarse-grained objects is a paragraph, a list, a table, a chart or an annotation. Each of the coarse-grained objects is spilt into a plurality of fine-grained objects. The system 1 also serves for determining whether a type of each of the fine-grained objects is a text line, a formula, a basic shape, a graffiti, or a set of mistyped strokes. The coarse-grained objects and the fine-grained objects form a tree structure shown in FIG. 5.

Figure 1:
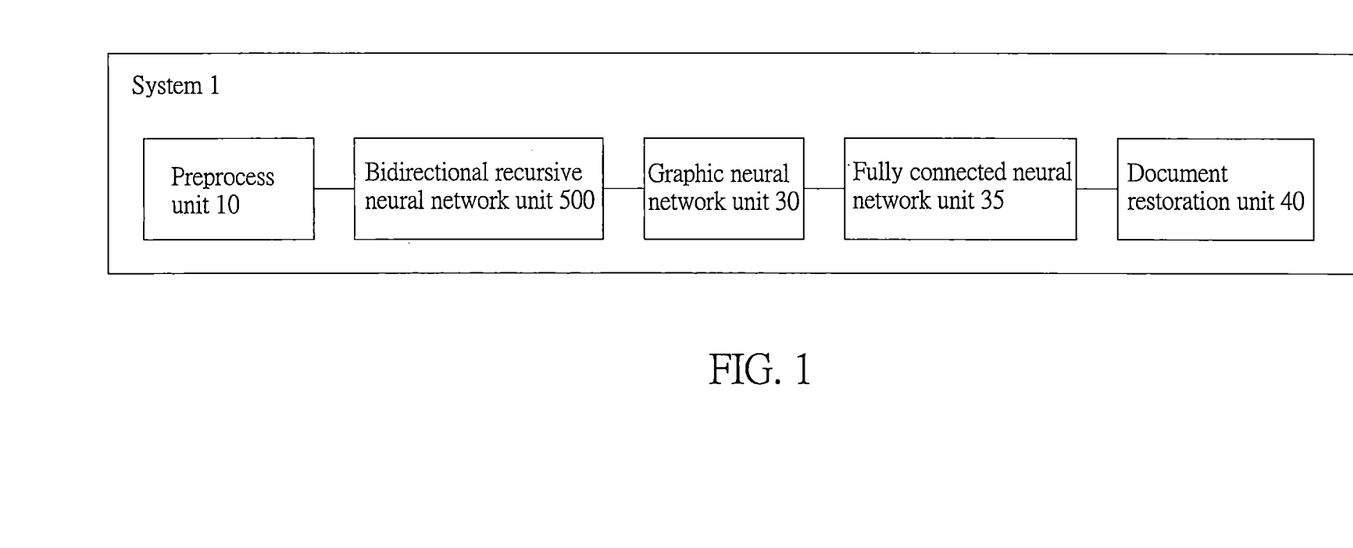
FIG. 1 is structured block diagram showing the main elements of the present invention.
Figure 2:
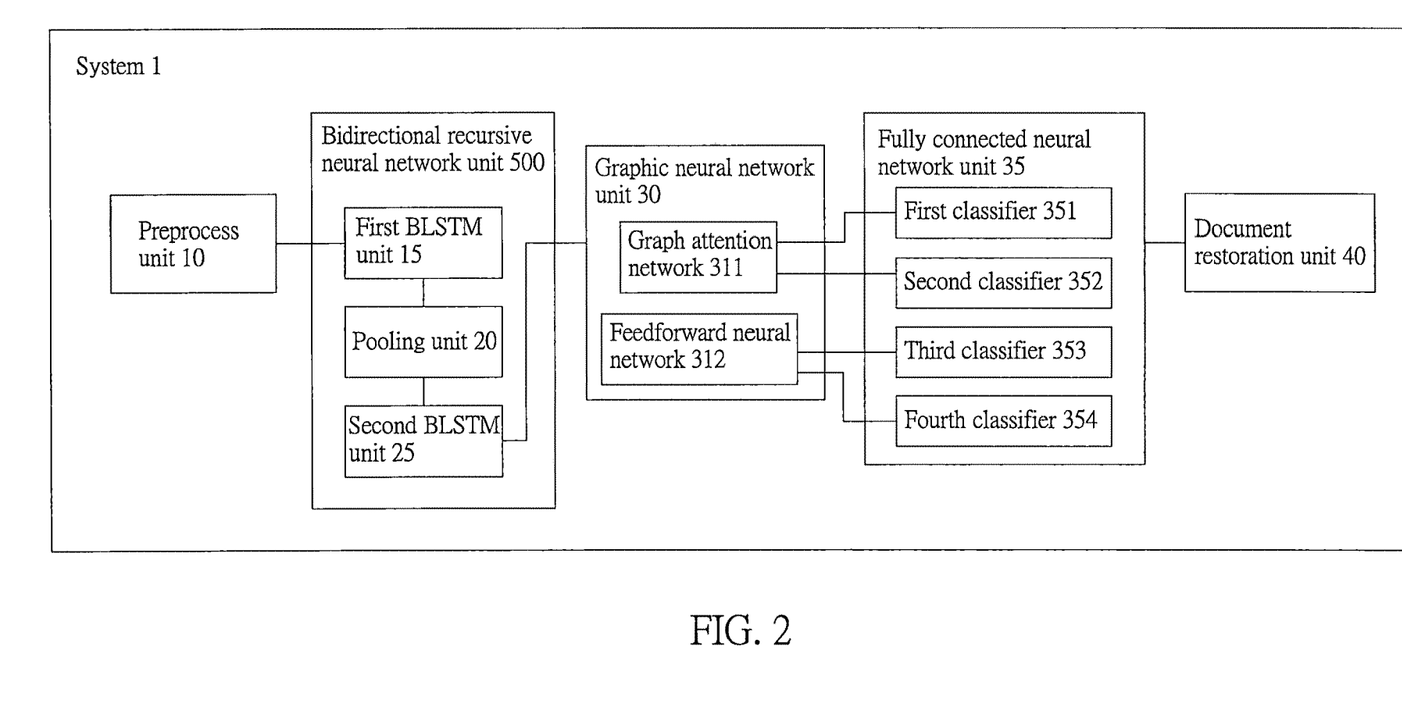
FIG. 2 is structured block diagram showing the elements of the present invention.
Figure 3:
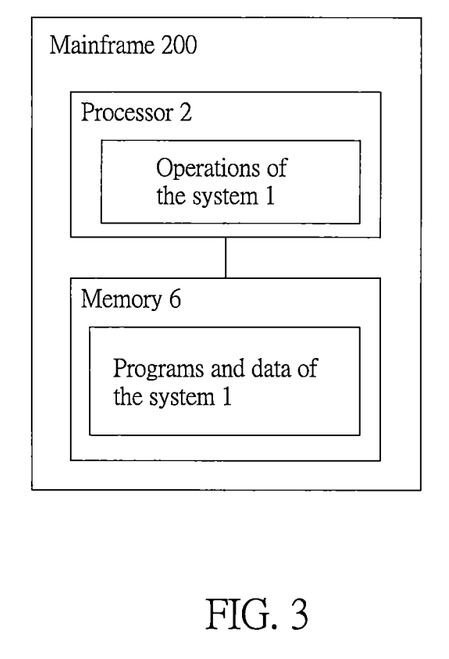
FIG. 3 is a structured block diagram showing the elements of the mainframe of the present invention.

With reference to FIGS. 1 to 3, the system 1 comprises a mainframe 200 which includes a processor 2 and a memory 6, as shown in FIG. 3. The processor 2 serves for executing required operations of the system 1. The memory 6 serves for storing data, programs and related operation results of the system 1.

Referring to FIGS. 1 and 2, the system 1 further comprises the following elements.

A preprocess unit 10 serves to receive the document 300 for performing a preprocessing on the document 300. The document 300 is an online handwriting document and is composed of a plurality of strokes. The plurality of strokes is m strokes which are close in time or space. The m strokes are represented as $v_1, v_2, \ldots, v_m$ and each of the strokes is represented as $v_i$, wherein $1 \leq i \leq m$. Each stroke $v_i$ of the strokes is composed of $n_i$ points which are represented as $(x_{i,1}, y_{i,1}), \ldots, (x_{i,n_i}, y_{i,n_i})$. The m strokes form a set $V = \{v_1, v_2, \ldots, v_m\}$.

In the preprocessing of the preprocess unit 10, the preprocess unit 10 serves to generate an undirected graph $G = (V, E)$ for representing relations between different strokes of the document 300 (step 100 in FIG. 4), wherein the undirected graph G includes a plurality of nodes and a plurality of edges, V is the set defined above ($V = \{v_1, v_2, \ldots, v_m\}$), and E is a set formed by the edges. Each of the nodes is corresponded to a respective one stroke, which is a directed sequence composed of the points of the stroke according to a writing order. Each of the edges is corresponded to a pair of respective strokes which are close in time or space. The pair of respective strokes close in time or space is corresponded to a respective one edge. Each of the m strokes and itself further form a set to form a respective one edge which is called a loop. That is, the loop is an edge connecting one stroke to itself.

In the undirected graph G, each of the m strokes is considered to be close in time to at most $N_T$ strokes written after it. For each of the m strokes, a closest point distance d between the stroke and the other strokes is calculated for determining at most $N_S$ strokes spatially closest in space to the stroke. Each of $N_T$ and $N_S$ is a predetermined value. The closest point distance d of each two strokes $v_i, v_{i'}$ of the m strokes is represented as $d(v_i, v_{i'}) = \min_{j,j'} \sqrt{(x_{i,j} - x_{i',j'})^2 + (y_{i,j} - y_{i',j'})^2}$. The closest point distance d is a minimum distance of the two strokes $v_i, v_{i'}$. The $\min_{j,j'}$ is a function for taking the minimum distance as the closest point distance d from the distances between each of the points of the stroke $v_i$ and all points of the stroke $v_{i'}$.

In the undirected graph $G = (V, E)$, $E = E_T \cup E_S$. $E_T = \{\{v_i, v_j\} | 1 \leq i \leq j \leq \min\{i + N_T, m\}\}$. $E_T$ is a set composed of the m strokes $v_1, v_2, \ldots, v_m$ and the $N_T$ strokes corresponding to each of the m strokes $v_1, v_2, \ldots, v_m$. Each of the strokes and the corresponding $N_T$ strokes close in time to it are connected through a corresponding edge.

$E_S = \{\{v_i, v_{j_k}\} | (j_1, \ldots) = \mathrm{argsort}_j d(v_i, v_j), 1 \leq k \leq \min\{m, N_S\}\}$. $E_S$ is a set composed of the m strokes $v_1, v_2, \ldots, v_m$ and the $N_S$ strokes corresponding to each of the m strokes $v_1, v_2, \ldots, v_m$. Each of the strokes and the corresponding $N_S$ strokes spatially closest in space to it are connected through a corresponding edge. The $\mathrm{argsort}_j$ is a function for sorting values of $d(v_i, v_j)$ in a descending order and returning a corresponding sequence of $j_k$ (referring to the NumPy module in Python programming language).

A bidirectional recursive neural network unit 500 is connected to the preprocess unit 10 for initializing a feature vector of each of the nodes in the undirected graph G and initializing a feature vector of each of edges in the undirected graph G by using recursive neural networks (RNN). The feature vector is a vector representing features of a corresponding paragraph, list, table, chart and annotation, etc. In the bidirectional recursive neural network unit 500, the feature vector of each of the edges is initialized with zero values.

Figure 4:
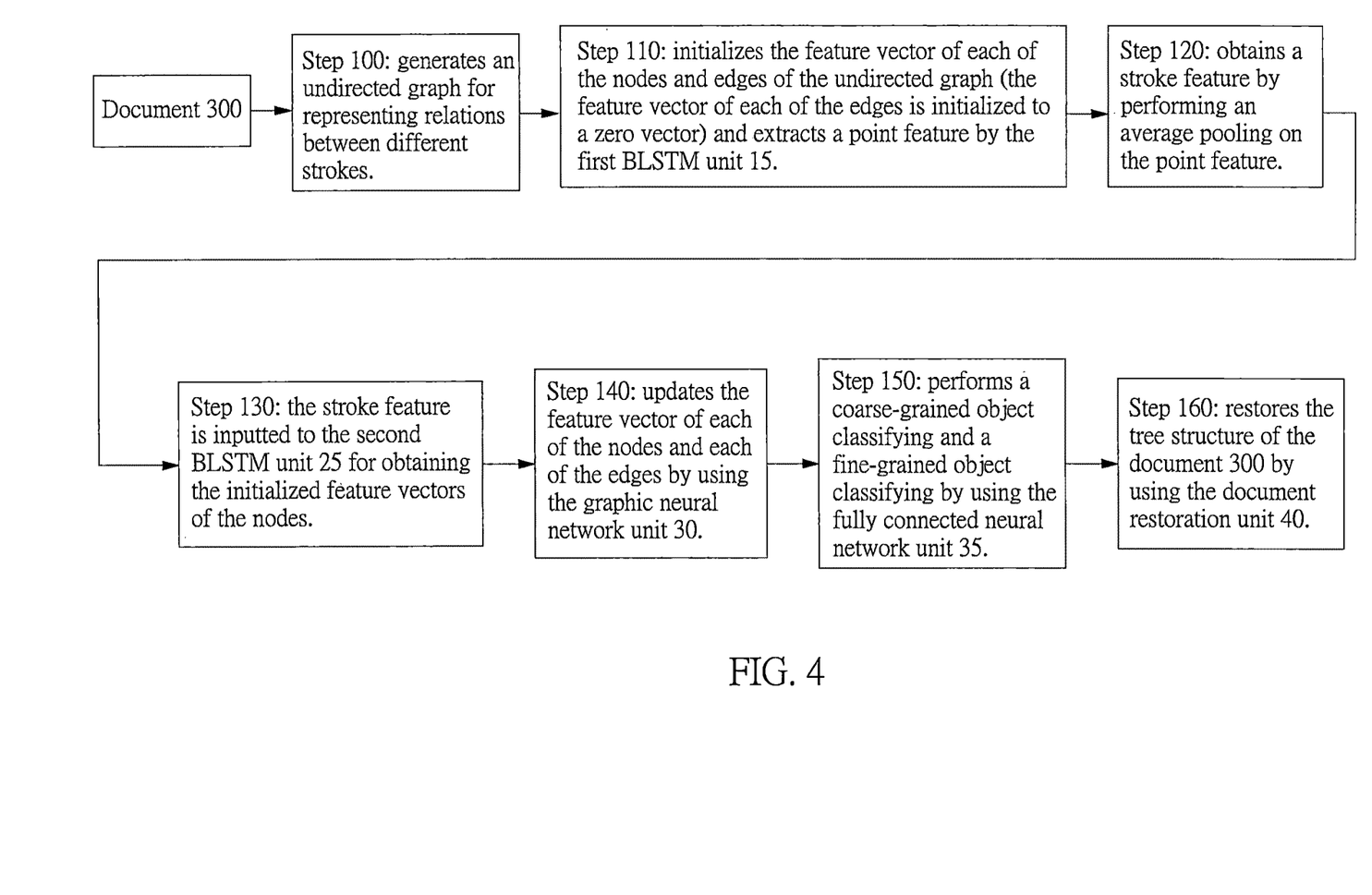
FIG. 4 is a steps flow diagram showing the processing of the document of the present invention.

Referring to FIG. 2, the bidirectional recursive neural network unit 500 includes the following elements:

A first BLSTM (Bidirectional Long Short-Term Memory) unit 15 is connected to the preprocess unit 10 for initializing the feature vector of each of the nodes and edges of the undirected graph G (step 110 in FIG. 4). Since a spatial positional relation between a pair of strokes $v_i$, $v_{i'}$ can be obtained from the pair of strokes $v_i$, $v_{i'}$ themselves, the feature vector of each of the edges is initialized to a zero vector and is represented as $E_{i,i'}^{(0)}$. The feature vector of each of the edges is corresponded a set corresponding to the pair of strokes $v_i$, $v_{i'}$.

Figure 6:
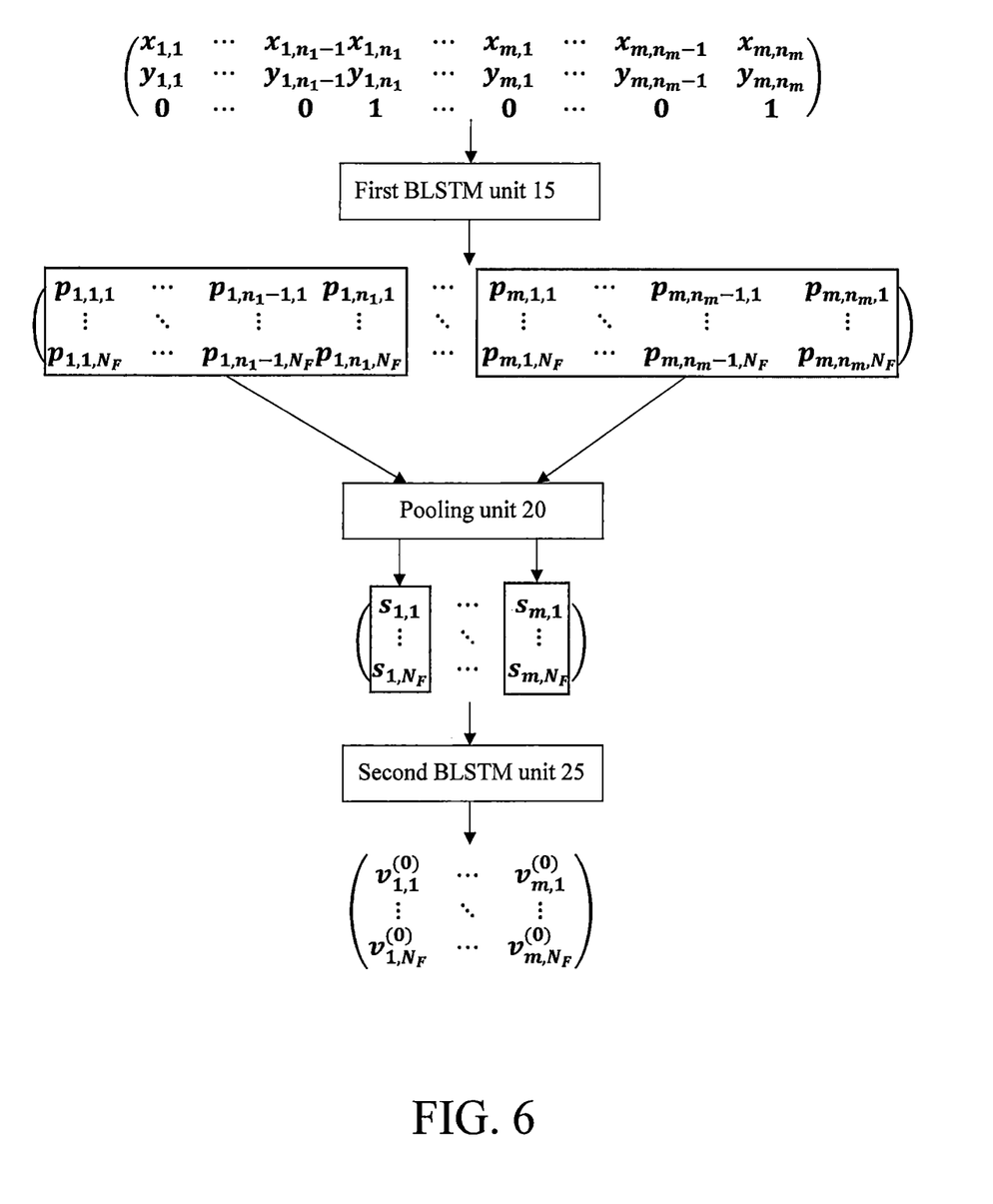
FIG. 6 is a schematic view showing the processing of the document of the present invention.

The first BLSTM unit 15 further serves to extract a point feature P that incorporates a context information, the point feature P is represented as $$P = (p_{i,j;k})_{i=1,\ldots,m,j=1,\ldots,n_i;k=1,\ldots,N_F} = BLSTM(I),$$

wherein $$I = \begin{pmatrix} x_{1,1} & \cdots & x_{1,n_1-1} & x_{1,n_1} & \cdots & x_{m,1} & \cdots & x_{m,n_m-1} & x_{m,n_m} \\ y_{1,1} & \cdots & y_{1,n_1-1} & y_{1,n_1} & \cdots & y_{m,1} & \cdots & y_{m,n_m-1} & y_{m,n_m} \\ 0 & \cdots & 0 & 1 & \cdots & 0 & \cdots & 0 & 1 \end{pmatrix},$$

as shown in FIG. 6.

A pooling unit 20 is connected to the first BLSTM unit 15 for aggregating the point feature P into a stroke feature by using an average pooling (step 120 in FIG. 4). The stroke feature is formed by relations between different strokes. The stroke feature is represented as $$s = (s_{i;k})_{i=1,\ldots,m;k=1,\ldots,N_F},$$

wherein $$s_{i;k} = \frac{1}{n_i} \sum_{j=1}^{n_i} p_{i,j;k}$$

(as shown in FIG. 6).

A second BLSTM (Bidirectional Long Short-Term Memory) unit 25 is connected to the pooling unit 20 and serves to receive the stroke feature from the pooling unit 20 for obtaining the initialized feature vectors of the nodes corresponding to the strokes $v_1, v_2, \ldots, v_m$ (step 130 in FIG. 4). The initialized feature vectors of the nodes are represented as $V_1^{(0)}$, $V_2^{(0)}, \ldots, V_m^{(0)}$ (as shown in FIG. 6), wherein $(V_1^{(0)} V_2^{(0)} \ldots V_m^{(0)})$=BLSTM(S).

Figure 7:
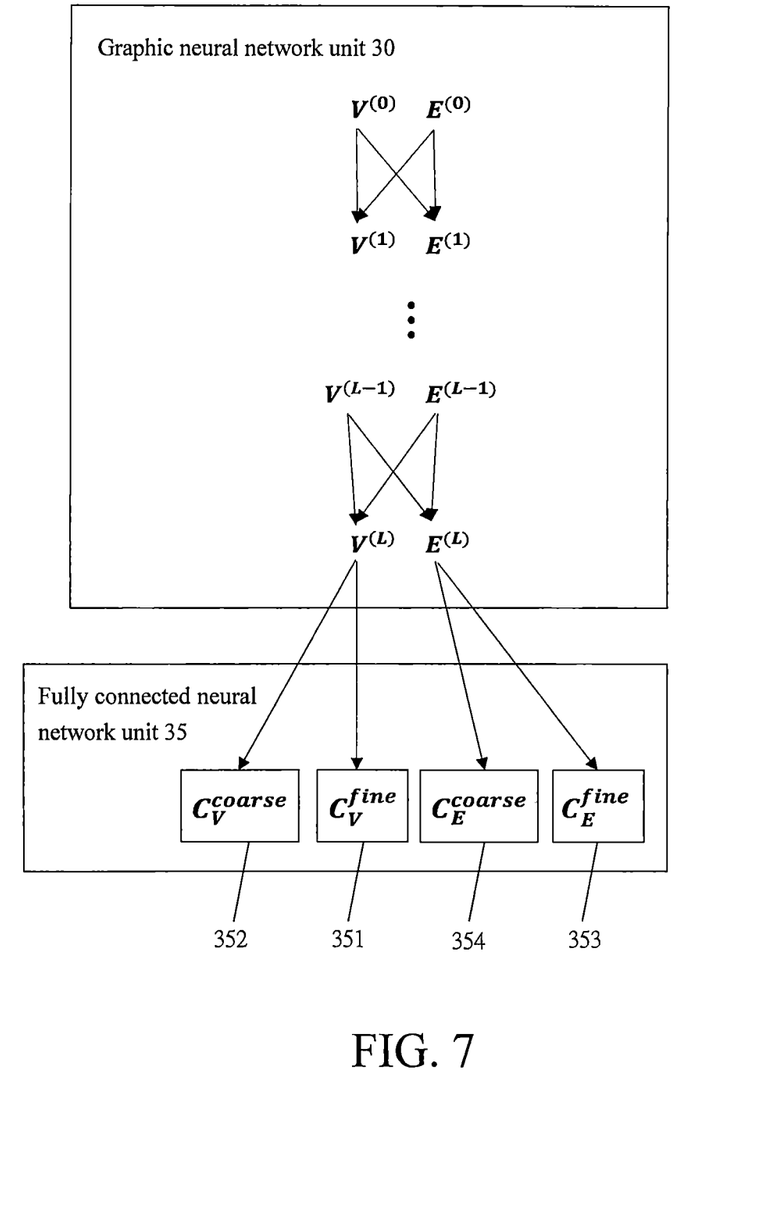
FIG. 7 is a schematic view showing the updating and classifying of the feature vectors of the nodes and edges of the present invention.

A graphic neural network unit 30 is connected to the second BLSTM unit 25 of the bidirectional recursive neural network unit 500. The graphic neural network unit 30 serves to update the feature vector of each of the nodes and the feature vector of each of the edges for obtaining an updated feature vector of each of the nodes and an updated feature vector of each of the edges by using a graphic neural network (GNN) which is based on a message passing (step 140 in FIG. 4). For each of the edges, the feature vector of the edge is updated by using a current feature vector of the edge, the feature vectors of nodes which correspond to the strokes in the edge, and the graphic neural network. Similarly, for each of the nodes, the feature vector of the node is updated by using the feature vector of the edge which is corresponded to the node, the feature vectors of nodes which are close in time or adjacent in space, and the graphic neural network. The initialized feature vectors $V_1^{(0)}$, $V_2^{(0)}, \ldots, V_m^{(0)}$ of the nodes obtained in the step 130 are inputted to a graph attention network (GAT) 311 for obtaining the updated feature vectors of the nodes. The initialized feature vector $E_{i,i'}^{(0)}$ of each of the edges is inputted to a feedforward neural network 312 for obtaining the updated feature vectors of the edges. Referring to FIG. 7, the feature vectors of the nodes and the edges are updated alternately a predetermined number of times for obtaining the updated feature vectors of the nodes and the edges. The updated feature vectors of the nodes and the edges incorporate the context information for classifying.

Referring to FIG. 7, the graphic neural network of the graphic neural network unit 30 is a graphic neural network with L-layers. The updated feature vector of each of the nodes is represented as $V_i^{(l)}=U_V^{(l)}(\{V_{i'}^{(l-1)}|(v_i, v_{i'})\in E\}, \{E_{i,i'}^{(l-1)}|v_i, v_{i'})\in E\})$, wherein the graph attention network 311 is represented as $U_V^{(l)}$ and $1\leq l\leq L$. The updated feature vector of each of the edges is represented as $E_{i,i'}^{(l)}=U_E^{(l)}(E_{i,i'}^{(l-1)}, V_i^{(l-1)}, V_{i'}^{(l-1)})$, wherein the feedforward neural network 312 is represented as $U_E^{(l)}$ and $1\leq l\leq L$.

A fully connected neural network unit 35 is connected to the graphic neural network unit 30. The fully connected neural network unit 35 serves for predicting the type of the coarse-grained object and the fine-grained object for the strokes corresponded to each of the nodes and for predicting that whether the pair of strokes corresponding to each of the edges belong to a same coarse-grained object or a same fine-grained object. In the predicting of the fully connected neural network unit 35, a coarse-grained object classifying and a fine-grained object classifying are performed for each of the nodes and the edges by using fully connected neural networks (FNN) based on the updated feature vectors of the nodes and the edges from the graphic neural network unit 30 (step 150 in FIG. 4).

Referring to FIGS. 2 and 7, the fully connected neural network unit 35 includes the following elements:

A first classifier 351 and a second classifier 352 serve to receive the updated feature vectors of the nodes for predicting the type of the coarse-grained object and the type of the fine-grained object to which each of the strokes corresponded to each of the nodes belongs, respectively.

A third classifier 353 and a fourth classifier 354 serve to receive the updated feature vectors of the edges for respectively predicting that whether the pair of strokes $v_i$, $v_{i'}$ corresponding to each of the edges belong to a same coarse-grained object or a same fine-grained object.

Each of the first classifier 351, second classifier 352, third classifier 353 and fourth classifier 354 is composed of a fully connected neural network and an activation function. The activation function may be a softmax function or a sigmoid function.

The first classifier 351 is connected to the graph attention network 311 and serves to output a node fine-grained confidence for each of the stroke $v_i$. The node fine-grained confidence is represented as $c_i^{fine}=\text{softmax}(C_V^{fine}(V_i^{(L)}))$, wherein $C_V^{fine}$ is a fully connected neural network and softmax is a normalized exponential function. In the first classifier 351, the updated feature vector $V_i^{(L)}$ is inputted to the fully connected neural network $C_V^{fine}$ and is passed to the softmax function to obtain the node fine-grained confidence $c_i^{fine}$. The node fine-grained confidence indicates a confidence that the stroke $v_i$ belongs to a text, a formula, a basic shape, a graffiti, or a set of accidentally touched strokes (which are the types of the fine-grained objects).

The second classifier 352 is connected to the graph attention network 311 and serves to output a node coarse-grained confidence for each of the stroke $v_i$. The node coarse-grained confidence is represented as $c_i^{coarse}=\text{softmax}(C_V^{coarse}(V_i^{(L)}))$, wherein $C_V^{coarse}$ is a fully connected neural network and softmax is a normalized exponential function. In the second classifier 352, the updated feature vector $V_i^{(L)}$ is inputted to the fully connected neural network $C_V^{coarse}$ and is passed to the softmax function for obtaining the node coarse-grained confidence $c_i^{coarse}$. The node coarse-grained confidence indicates a confidence that the stroke $v_i$ belongs to a paragraph, a list, a table, a chart or an annotation (which are the types of the coarse-grained objects).

The third classifier 353 is connected to the feedforward neural network 312 and serves to output an edge fine-grained confidence for the pair of strokes $v_i$, $v_{i'}$ corresponding to each of the edges. The edge fine-grained confidence is represented as $c_{i,i'}^{fine}=\text{sigmoid}(C_E^{fine}(E_{i,i'}^{(L)}))$, wherein $C_E^{fine}$ is a fully connected neural network. In the third classifier 353, the updated feature vector $E_{i,i'}^{(L)}$ is inputted to the fully connected neural network $C_E^{fine}$ and is passed to the sigmoid function for obtaining the edge fine-grained confidence $c_{i,i'}^{fine}$. The edge fine-grained confidence indicates a confidence that the pair of strokes $v_i$, $v_{i'}$ belong to a same fine-grained object.

The fourth classifier 354 is connected to the feedforward neural network 312 and serves to output an edge coarse-grained confidence for the pair of strokes $v_i$, $v_{i'}$ corresponding to each of the edges. The edge coarse-grained confidence is represented as $c_{i,i'}^{coarse}=\text{sigmoid}(C_E^{coarse}(E_{i,i'}^{(L)}))$, wherein $C_E^{coarse}$ is a fully connected neural network. In the fourth classifier 354, the updated feature vector $E_{i,i'}^{(L)}$ is inputted to the fully connected neural network $C_E^{coarse}$ and is passed to the sigmoid function for obtaining the edge coarse-grained confidence $c_{i,i'}^{coarse}$. The edge coarse-grained confidence indicates a confidence that the pair of strokes $v_i$, $v_{i'}$ belong to a same coarse-grained object.

A document restoration unit 40 is connected to the fully connected neural network unit 35 for restoring a tree structure of the document 300 (step 160 in FIG. 4), as shown in FIG. 5. The document restoration unit 40 serves to group all strokes to obtain the corresponding fine-grained objects by using a connected component analysis according to predicting results (the edge fine-grained confidences) of the strokes belonging to the same fine-grained object in the fully connected neural network unit 35. The type of each of the corresponding fine-grained objects is determined by a sum of the confidences (the node fine-grained confidences) that the strokes in the fine-grained object are predicted to belong to a specific type of the fine-grained object in the fully connected neural network unit 35.

The document restoration unit 40 further serves to group the corresponding fine-grained objects to obtain the corresponding coarse-grained objects by using the connected component analysis according to predicting results (the edge coarse-grained confidences) of the strokes belonging to the same coarse-grained object in the fully connected neural network unit 35. The type of each of the corresponding coarse-grained objects is determined by a sum of the confidences (the node coarse-grained confidences) that the strokes in the coarse-grained object are predicted to belong to a specific type of the coarse-grained object in the fully connected neural network unit 35.

When the edge fine-grained confidence $c_{i,i'}^{fine}<0.5$, the document restoration unit 40 removes the edge corresponded to the pair of corresponding strokes $v_i$, $v_{i'}$ from the undirected graph G and performs the connected component analysis again for obtaining a plurality of connecting branches. Each of the connecting branches is corresponded to a respective one fine-grained object whose type is determined by a sum of the node fine-grained confidences $c_i^{fine}$ corresponding to the nodes in the fine-grained object.

When the edge coarse-grained confidence $c_{i,i'}^{coarse} \geq 0.5$, the fine-grained objects which the pair of strokes $v_i$, $v_{i'}$ belong to are categorized into a same coarse-grained object. The document restoration unit 40 performs the connected component analysis again for obtaining the corresponding coarse-grained objects. The type of each of the corresponding coarse-grained objects is determined by a sum of the node coarse-grained confidences $c_i^{coarse}$ corresponding to the nodes in the coarse-grained object.

The advantages of the present invention are that, in the present invention, the online handwriting document layout analysis system is capable of supporting segmentation and classification over a range of multiple granularity objects, which can simultaneously perform text/non-text classification, text line segmentation, chart detection and identification, table detection and identification, and mathematical formula detection. The present invention is capable of performing various fine-grained object segmentation and classification simultaneously, dividing strokes into multiple coarse-grained objects and determining whether they are a paragraph, a list, a table, a chart, or an annotation. The present invention also can subdivide the strokes of each coarse-grained object into multiple fine-grained objects and determining whether they are a line of text, a formula, a basic shape, a graffiti, or a set of mistyped strokes. Therefore, the text/non-text classification, text line segmentation, chart detection and identification, table detection and identification, and mathematical formula detection can all be analyzed by using the system of the present invention.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An online handwriting document layout analysis system; the system serving for segmenting a document into a plurality of coarse-grained objects for determining whether a type of each of the coarse-grained objects is a paragraph, a list, a table, a chart or an annotation; each of the coarse-grained objects being spilt into a plurality of fine-grained objects; the system serving for determining whether a type of each of the fine-grained objects is a text line, a formula, a basic shape, a graffiti, or a set of mistyped strokes; the coarse-grained objects and the fine-grained objects forming a tree structure; the system comprising a mainframe which includes a processor and a memory; and the processor serving for executing required operations of the system and the memory serving for storing data, programs and related operation results of the system;

the system further comprising:

a preprocess unit serving to receive the document for performing a preprocessing on the document; the document being an online handwriting document and being composed of a plurality of strokes which are close in time or space;

wherein in the preprocessing of the preprocess unit, the preprocess unit serves to generate an undirected graph for representing relations between different strokes of the document; the undirected graph includes a plurality of nodes and a plurality of edges; each of the nodes is corresponded to a respective one stroke, which is a directed sequence composed of the points of the stroke according to a writing order; each of the edges is corresponded to a pair of respective strokes which are close in time or space; the pair of respective strokes close in time or space is corresponded to a respective one edge; each of the strokes and itself further form a set to form a respective one edge which is called a loop; that is, the loop is an edge connecting one stroke to itself;

wherein in the undirected graph, each of the strokes is considered to be close in time to at most $N_T$ strokes written after it; for each of the strokes, a closest point distance between the stroke and the other strokes is calculated for determining at most $N_S$ strokes spatially closest in space to the stroke; each of $N_T$ and $N_S$ is a predetermined value;

a bidirectional recursive neural network unit connected to the preprocess unit for initializing a feature vector of each of the nodes in the undirected graph and initializing a feature vector of each of edges in the undirected graph by using recursive neural networks (RNN); wherein in the bidirectional recursive neural network unit, the feature vector of each of the edges is initialized with zero values;

a graphic neural network unit connected to the bidirectional recursive neural network unit; the graphic neural network unit serving to update the feature vector of each of the nodes and the feature vector of each of the edges for obtaining an updated feature vector of each of the nodes and an updated feature vector of each of the edges by using a graphic neural network (GNN) which is based on a message passing;

a fully connected neural network unit connected to the graphic neural network unit; the fully connected neural network unit serving for predicting the type of the coarse-grained object and the fine-grained object for the strokes corresponded to each of the nodes and for predicting that whether the pair of strokes corresponding to each of the edges belong to a same coarse-grained object or a same fine-grained object; wherein in the predicting of the fully connected neural network unit, a coarse-grained object classifying and a fine-grained object classifying are performed for each of the nodes and the edges by using fully connected neural networks (FNN) based on the updated feature vectors of the nodes and the edges from the graphic neural network unit;

a document restoration unit connected to the fully connected neural network unit for restoring the tree structure of the document; the document restoration unit serving to group all strokes to obtain the corresponding fine-grained objects by using a connected component analysis according to predicting results of the strokes belonging to the same fine-grained object in the fully connected neural network unit; wherein in the document restoration unit, the type of each of the corresponding fine-grained objects is determined by a sum of the confidences that the strokes in the fine-grained object are predicted to belong to a specific type of the fine-grained object in the fully connected neural network unit; and the document restoration unit further serving to group the corresponding fine-grained objects to obtain the corresponding coarse-grained objects by using a connected component analysis according to predicting results of the strokes belonging to the same coarse-grained object in the fully connected neural network unit; wherein in the document restoration unit, the type of each of the corresponding coarse-grained objects is determined by a sum of the confidences that the strokes in the coarse-grained object are predicted to belong to a specific type of the coarse-grained object in the fully connected neural network unit.

2. The online handwriting document layout analysis system as claimed in claim 1, wherein the bidirectional recursive neural network unit comprises:

a first BLSTM (Bidirectional Long Short-Term Memory) unit connected to the preprocess unit for initializing the feature vector of each of the nodes and each of the edges; the feature vector being a vector representing features of a corresponding paragraph, list, table, chart and annotation; a spatial positional relation between the a pair of strokes being obtained from the pair of strokes themselves and the feature vector of each of the edges being initialized to a zero vector; the feature vector of each of the edges being corresponded to a set corresponding to the pair of strokes; the first BLSTM unit further serving to extract a point feature that incorporates a context information;

a pooling unit connected to the first BLSTM unit for aggregating the point feature into a stroke feature by using an average pooling; the stroke feature being formed by relations between different strokes; and a second BLSTM (Bidirectional Long Short-Term Memory) unit connected to the pooling unit and serving to receive the stroke feature from the pooling unit for obtaining the initialized feature vectors of the nodes corresponding to the strokes.

3. The online handwriting document layout analysis system as claimed in claim 2, wherein in the graphic neural network unit, for each of the edges, the feature vector of the edge is updated by using a current feature vector of the edge, the feature vectors of nodes which correspond to the strokes in the edge, and the graphic neural network; for each of the nodes, the feature vector of the node is updated by using the feature vector of the edge which is corresponded to the node, the feature vectors of nodes which are close in time or adjacent in space, and the graphic neural network; the feature vectors of the nodes and the edges are updated alternately a predetermined number of times for obtaining the updated feature vectors of the nodes and the edges; and the updated feature vectors of the nodes and the edges incorporate the context information for classifying.

4. The online handwriting document layout analysis system as claimed in claim 3, wherein the fully connected neural network unit comprises:
- a first classifier and a second classifier serving to receive the updated feature vectors of the nodes for predicting the type of the coarse-grained object and the type of the fine-grained object to which each of the strokes corresponded to each of the nodes belongs, respectively;
- a third classifier and a fourth classifier serving to receive the updated feature vectors of the edges for respectively predicting that whether the pair of strokes corresponding to each of the edges belong to a same coarse-grained object or a same fine-grained object; and
- wherein each of the first classifier, second classifier, third classifier and fourth classifier is composed of a fully connected neural network and an activation function.

5. The online handwriting document layout analysis system as claimed in claim 4, wherein the plurality of strokes of the document is m strokes which are represented as $v_1, v_2, \ldots, v_m$ and each of the strokes is represented as $v_i$, wherein $1 \leq i \leq m$; each stroke $v_i$ of the strokes is composed of $n_i$ points which are represented as $(x_{i,1}, y_{i,1}), \ldots, (x_{i,n_i}, y_{i,n_i})$; the m strokes form a set $V=\{v_1, v_2, \ldots, v_m\}$; and the undirected graph is represented as $G=(V, E)$, wherein E is a set formed by the edges.

6. The online handwriting document layout analysis system as claimed in claim 5, wherein the closest point distance of each two strokes $v_i$, $v_{i'}$ of the m strokes is represented as $d(v_i, v_{i'}) = \min_{j,j'} \sqrt{(x_{i,j}-x_{i',j'})^2 + (y_{i,j}-y_{i',j'})^2}$; the closest point distance is a minimum distance of the two strokes $v_i$, $v_{i'}$; the mini is a function for taking the minimum distance as the closest point distance d from the distances between each of the points of the stroke $v_i$ and all points of the stroke $v_{i'}$;
wherein $E = E_T \cup E_S$; $E_T = \{\{v_i, v_j\} | 1 \leq i \leq j \leq \min\{i+N_T, m\}\}$; $E_T$ is a set composed of the m strokes $v_1, v_2, \ldots, v_m$ and the $N_T$ strokes corresponding to each of the m strokes $v_1, v_2, \ldots, v_m$; each of the strokes and the corresponding $N_T$ strokes close in time to it are connected through a corresponding edge; and
wherein $E_S = \{\{v_i, v_{j_k}\} | (j_1, \ldots) = \text{argsort}_j d(v_i, v_j), 1 \leq k \leq \min\{m, N_S\}\}$; $E_S$ is a set composed of the m strokes $v_1, v_2, \ldots, v_m$ and the $N_S$ strokes corresponding to each of the m strokes $v_1, v_2, \ldots, v_m$; each of the strokes and the corresponding $N_S$ strokes spatially closest in space to it are connected through a corresponding edge; and the $\text{argsort}_j$ is a function for sorting values of $d(v_i, v_j)$ in a descending order and returning a corresponding sequence of $j_k$.

7. The online handwriting document layout analysis system as claimed in claim 6, wherein in the first BLSTM unit, the feature vector of each of the edges is represented as $E_{i,i'}^{(0)}$, which is corresponded the set corresponding to the pair of strokes $v_i$, $v_{i'}$; and
wherein the point feature extracted by the first BLSTM unit is represented as $$P = (p_{i,j;k})_{i=1,\ldots,m;j=1,\ldots,n_i;k=1,\ldots,N_F} = BLSTM(I), \text{ and}$$

$$I = \begin{pmatrix} x_{1,1} & \cdots & x_{1,n_1-1} & x_{1,n_1} & \cdots & x_{m,1} & \cdots & x_{m,n_m-1} & x_{m,n_m} \\ y_{1,1} & \cdots & y_{1,n_1-1} & y_{1,n_1} & \cdots & y_{m,1} & \cdots & y_{m,n_m-1} & y_{m,n_m} \\ 0 & \cdots & 0 & 1 & \cdots & 0 & \cdots & 0 & 1 \end{pmatrix}.$$

8. The online handwriting document layout analysis system as claimed in claim 7, wherein in the pooling unit, the stroke feature is represented as $$S = (s_{i;k})_{i=1,\ldots,m;k=1,\ldots,N_F},$$

wherein $$s_{i;k} = \frac{1}{n_i} \sum_{j=1}^{n_i} p_{i,j;k};$$

wherein in the second BLSTM unit, the initialized feature vectors of the nodes corresponding to the strokes $v_1, v_2, \ldots, v_m$ are represented as $V_1^{(0)}, V_2^{(0)}, \ldots, V_m^{(0)}$, wherein $(V_1^{(0)} V_2^{(0)} \ldots V_m^{(0)}) = BLSTM(S)$;
wherein in the graphic neural network unit, the initialized feature vectors $V_1^{(0)}, V_2^{(0)}, \ldots, V_m^{(0)}$ of the nodes are inputted to a graph attention network (GAT) for obtaining the updated feature vectors of the nodes; the initialized feature vector $E_{i,i'}^{(0)}$ of each of the edges is inputted to a feedforward neural network for obtaining the updated feature vectors of the edges; and
wherein the graphic neural network of the graphic neural network unit is a graphic neural network with L-layers; the updated feature vector of each of the nodes is: represented as $V_i^{(l)} = U_V^{(l)}(\{V_{i'}^{(l-1)} | (v_i, v_{i'}) \in E\}, \{E_{i,i'}^{(l-1)} | v_i, v_{i'}) \in E\})$, wherein the graph attention network is represented as $U_V^{(l)}$ and $1 \leq l \leq L$; the updated feature vector of each of the edges is represented as $E_{i,i'}^{(l)} = U_E^{(l)}(E_{i,i'}^{(l-1)}, V_i^{(l-1)}, V_{i'}^{(l-1)})$, wherein the feedforward neural network is represented as $U_E^{(l)}$ and $1 \leq l \leq L$.

9. The online handwriting document layout analysis system as claimed in claim 8, wherein the first classifier of the fully connected neural network unit is connected to the graph attention network and serves to output a node fine-grained confidence for each of the stroke $v_i$; the node fine-grained confidence is represented as $c_i^{fine} = \text{softmax}(C_V^{fine}(V_i^{(L)}))$, wherein $C_V^{fine}$ is a fully connected neural network and softmax is a normalized exponential function; in the first classifier, the updated feature vector $V_i^{(L)}$ is inputted to the fully connected neural network $C_V^{fine}$ and is passed to the softmax function to obtain the node fine-grained confidence $c_i^{fine}$; the node fine-grained confidence indicates a confidence that the stroke $v_i$ belongs to a text, a formula, a basic shape, a graffiti, or a set of accidentally touched strokes;
wherein the second classifier of the fully connected neural network unit is connected to the graph attention network and serves to output a node coarse-grained confidence for each of the stroke $v_i$; the node coarse-grained confidence is represented as $c_i^{coarse} = \text{softmax}(C_V^{coarse}(V_i^{(L)}))$, wherein $C_V^{coarse}$ is a fully connected neural network and softmax is a normalized exponential function; in the second classifier, the updated feature vector $V_i^{(L)}$ is inputted to the fully connected neural network $C_V^{coarse}$ and is passed to the softmax function for obtaining the node coarse-grained confidence $c_i^{coarse}$; the node coarse-grained confidence indicates a confidence that the stroke $v_i$ belongs to a paragraph, a list, a table, a chart or an annotation;
wherein the third classifier of the fully connected neural network unit is connected to the feedforward neural network and serves to output an edge fine-grained confidence for the pair of strokes $v_i$, $v_{i'}$ corresponding to each of the edges; the edge fine-grained confidence is represented as $c_{i,i'}^{fine}=\text{sigmoid}(C_E^{fine}(E_{i,i'}^{(L)}))$, wherein $C_E^{fine}$ is a fully connected neural network; in the third classifier, the updated feature vector $E_{i,i'}^{(L)}$ is inputted to the fully connected neural network $C_E^{fine}$ and is passed to the sigmoid function for obtaining the edge fine-grained confidence $c_{i,i'}^{fine}$; the edge fine-grained confidence indicates a confidence that the pair of strokes $v_i$, $v_{i'}$ belong to a same fine-grained object; and wherein the fourth classifier of the fully connected neural network unit is connected to the feedforward neural network and serves to output an edge coarse-grained confidence for the pair of strokes $v_i$, $v_{i'}$ corresponding to each of the edges; the edge coarse-grained confidence is represented as $c_{i,i'}^{coarse}=\text{sigmoid}(C_E^{coarse}(E_{i,i'}^{(L)}))$, wherein $C_E^{coarse}$ is a fully connected neural network; in the fourth classifier, the updated feature vector $E_{i,i'}^{(L)}$ is inputted to the fully connected neural network $C_E^{coarse}$ and is passed to the sigmoid function for obtaining the edge coarse-grained confidence $c_{i,i'}^{coarse}$; the edge coarse-grained confidence indicates a confidence that the pair of strokes $v_i$, $v_{i'}$ belong to a same coarse-grained object.

10. The online handwriting document layout analysis system as claimed in claim 9, wherein when the edge fine-grained confidence $c_{i,i'}^{fine}<0.5$, the document restoration unit removes the edge corresponded to the pair of corresponding strokes $v_i$, $v_{i'}$ from the undirected graph G and performs the connected component analysis again for obtaining a plurality of connecting branches; each of the connecting branches is corresponded to a respective one fine-grained object whose type is determined by a sum of the node fine-grained confidences $c_i^{fine}$ corresponding to the nodes in the fine-grained object; and wherein when the edge coarse-grained confidence $c_{i,i'}^{coarse}\geq 0.5$, the fine-grained objects which the pair of strokes $v_i$, $v_{i'}$ belong to are categorized into a same coarse-grained object; the document restoration unit performs the connected component analysis again for obtaining the corresponding coarse-grained objects; and the type of each of the corresponding coarse-grained objects is determined by a sum of the node coarse-grained confidences $c_i^{coarse}$ corresponding to the nodes in the coarse-grained object.

\* \* \* \* \*